United States Patent [19]
Rocklin

[11] 3,852,320
[45] Dec. 3, 1974

[54] ALLYL 2,2-DINITROPROPYL CARBONATE

[75] Inventor: Albert L. Rocklin, Walnut Creek, Calif.

[73] Assignee: Shell Oil Company, New York, N.Y.

[22] Filed: Oct. 12, 1970

[21] Appl. No.: 81,638

[52] U.S. Cl................................ 260/463, 149/109
[51] Int. Cl............................................. C07c 69/00
[58] Field of Search ...................................... 260/463

[56] References Cited
UNITED STATES PATENTS
3,461,162   8/1969   Koshar et al.................. 260/463 X

*Primary Examiner*—Leland A. Sebastian
*Attorney, Agent, or Firm*—Henry C. Geller

[57] ABSTRACT

The novel allyl 2,2-dinitropropyl carbonate and the conversion thereof to the novel 2,3-bis(difluoramino)-propyl 2,2-dinitropropyl carbonate useful as a high energy plasticizer of polymeric binders for solid propellant systems.

8 Claims, No Drawings

ALLYL 2,2-DINITROPROPYL CARBONATE

The Invention herein described was made in the course of or under a contract or subcontract thereunder, wit the United States Air Force.

CROSS-REFERENCE TO RELATED APPLICATIONS

This application is related to copending application of Albert L. Rocklin and Walter L. Petty, U.S. Ser. No. 81,637 filed of even date, now U.S. Pat. No. 3,784,422.

BACKGROUND OF THE INVENTION

High-energy polymers used as high-energy binders for solid propellant systems are generally viscous liquids which require a plasticizer in order to mix, case, and cure to propellants with acceptable physical properties. Difluoramino-containing compounds which are per se energetic have been used as plasticizers. Since difluoramino compounds tend to be highly sensitive to shock and friction, it would be advantageous to minimize this unwelcome contribution to the hazards of propellant formulation by having available a highly energetic difluoramino plasticizer having reduced shock and friction sensitivity.

SUMMARY OF THE INVENTION

It has now been found that the novel 2,3-bis(difluoramino)propyl 2,2-dinitropropyl carbonate is a highly energetic nitro-difluoramino plasticizer having greatly reduced shock and friction sensitivity and that it can be produced by reacting the novel allyl 2,2-dinitropropyl carbonate, which is advantageously not shock-sensitive, with tetrafluorohydrazine, $N_2F_4$. The novel composition of the invention, allyl 2,2-dinitropropyl carbonte, of the formula

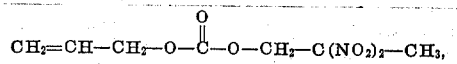

is produced advantageously by the reaction of 2,2-dinitropropanol with allyl chloroformate in the presence of pyridine.

PREFERRED EMBODIMENTS OF THE INVENTION

The novel 2,3-bis(difluoramino)propyl 2,2-dinitropropyl carbonate is a mixed carbonate of two different alcohols, a nitroalcohol (2,2-dinitropropanol) and a difluoraminoalcohol [2,3-bis(difluoramino)propanol]. Generally, mixed carbonates of two different alcohols are prepared by reaction of one alcohol with the chloroformate of the other. However, the production of the hereinabove carbonate involving the nitroalcohol and the difluoraminoalcohol and proceeding via the chloroformate of one or the other encounters a number of difficulties, namely, (1) THE chloroformate of the nitroalcohol is difficult to prepare by the usual methods, (2) the difluoraminoalcohol is highly shock-sensitive, and (3) the reaction of the nitroalcohol with the chloroformate of the difluoraminoalcohol requires, as hydrogen chloride acceptor, pyridine which is sufficiently basic to destroy difluoramino groups in the difluoraminoalkyl chloroformate. These difficulties have been obviated by reacting 2,2-dinitropropanol with allyl chloroformate to produce the novel allyl 2,2-dinitropropyl carbonate. The allyl 2,2-dinitropropyl carbonate is subsequently reacted with tetrafluorohydrazine to produce the desired 2,3-bis(difluoramino)propyl 2,2-dinitropropyl carbonate.

Allyl chloroformate is conveniently produced in high yield by treatment of allyl alcohol with liquid phosgene. The reaction of allyl chloroformate with 2,2-dinitropropanol is conducted in the presence of pyridine as hydrogen chloride acceptor to produce in high yield allyl 2,2-dinitropropyl carbonate, which can be highly purified by distillation. This reaction is conducted in the presence or in the absence of a liquid organic diluent or solvent. In the modification wherein a diluent is employed, diluents that are suitable are those capable of dissolving the reactants and acid acceptor, and are inert to the reactants and the allyl 2,2-dinitropropyl carbonate prepared therefrom. Exemplary diluents or solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons, such as benzene, toluene, and xylene; dialkyl ketones such as acetone, methyl ethyl ketone, methyl isobutyl ketone and diethyl ketone; halogenated hydrocarbons such as dichloromethane, chloroform, carbon tetrachloride, dichloroethane, tetrachloroethylene, bromoform, dibromoethane, chloropropane, bromobutane, 1-chloro-2,2-difluoroethane, chloropentane, chlorobenzene, chlorocyclohexane and the like; sulfoxides such as dimethylsulfoxide, and tertiary amines such as pyridine, triethylamine and N,N-dimethylaniline. The solvent or diluent, if any, is employed in molar excess over the amount of total reactants, and, in general, moles of solvent up to about 150 moles per mole of total reactants are satisfactory. A particularly preferred group of diluents includes halogenated hydrocarbons of 1 to 6 carbon atoms, especially chlorohydrocarbons, and most preferred is 1,2-dichloroethane. The reaction is preferably carried out by adding allyl chloroformate to a 2,2-dinitropropanol-pyridine solution. The reaction requires essentially one mole of pyridine for each mole of 2,2-dinitropropanol reacted with allyl chloroformate. Although two percent in excess of the stoichiometric requirements of pyridine and allyl chloroformate is preferred, a larger excess such as up to ten percent may be used. The temperature at which the reaction is carried out is in the range of from about −35°C to about 25°. A preferred temperature range is that of from about −10°C to about −25°C; most preferred is a temperature of about −20°C.

The addition of tetrafluorohydrazine to allyl 2,2-dinitropropyl carbonate is essentially quantitative and can be accomplished conveniently in a batchwise or continuous manner. The temperature at which the addition is conducted is from about 50°C TO about 125°C, preferably at about 105°C. The resulting 2,3-bis(difluoramino)propyl 2,2-dinitropropyl carbonate is purified by conventional means such as fractional distillation, solution chromatography, and the like. A preferred and convenient method of purification, producing a product of purity and stability comparable to that from distillation, is washing with aqueous sodium bicarbonate followed by treatment with an acidic ion exchange resin such as Amberlyst 15 (Rohm and Haas Company) and with a molecular sieve such as 13x molecular sieve.

By the above-described process, 2,2-dinitropropanol can be converted to the desired carbonate derivative without having to subject the difluoramino compound to damaging pyridine treatment. Moreover, the intermediate allyl 2,2-dinitropropyl carbonate is not shock-sensitive and can be highly purified in conventional equipment. Hazardous operations involving sensitive difluoraminoalcohol are avoided, and the handling of difluoramino compounds is deferred to the last step which can be conducted safely, for example, in a pipeline reactor. The use of 2,3-bis(difluoramino)propyl 2,2-dinitropropyl carbonate as a high-energy plasticizer of polymeric binders for solid propellant systems is described in copending application of Albert L. Rocklin and Walter L. Petty, U.S. Ser. No. 81,637 filed of even date, now U.S. Pat. No. 3,784,422.

EXAMPLE 1

To 1075 g of a 23.0 percent solution of 2,2-dinitropropanol (247g, 1.65 moles) in 1,2-dichloroethane was added, during 15 minutes 138 g (1.75 moles) pyridine, the temperature being maintained at −10°C by an acetone-Dry Ice bath. To this was added, during a 2 hour period a solution of 208 g (1.73 moles) allyl chloroformate in 250 ml 1,2-dichloroethane. The reaction mixture was kept at −10°C throughout the addition and for three hours thereafter, then allowed to warm up to ambient temperature. The mixture was diluted with 1,800 ml hexane then washed three times with 4 percent aqueous sodium bicarbonate solution, and twice with water. After drying with anhydrous magnesium sulfate and stripping off solvent under vacuum there remained 342 g light amber liquid. The allyl 2,2-dinitropropyl carbonate product was rectified by topping on a 1 inch × 2 inches Vigreux distillation column operating at 20 microns pressure and at a high reflux ratio, then flash distilling the bottoms. Gas chromatographic analysis showed that the bottoms were free from low boiling components when about 20 percent had been topped. The allyl 2,2-dinitropropyl carbonate product, a colorless liquid weighing 280 g (72.8 percent), distilled at 96°C at 20 microns The proton nuclear magnetic resonance (NMR) spectrum was in agreement with the assigned structure. No impurities were detected.

Analysis Calculated for: $C_7H_{10}N_2O_7$: C, 35.8; H, 4.3; N, 11.9;

Found: C, 36.1; H, 4.4; N, 11.1.

Whereas the impact sensitivity of many energetic plasticizers may vary from about 2 to about 15 kg-cm as measured by the Olin-Mathieson closed-cup impact testing method where increasing values indicate increasing stability (e.g., nitroglycerine has a value of 2), allyl 2,2-dinitropropyl carbonate gives a negative impact test result even at 150 kg-cm.

I claim as my invention:

1. Allyl 2,2-dinitropropyl carbonate.
2. The process of producing allyl 2,2-dinitropropyl carbonate by reacting 2,2-dinitropropanol with allyl chloroformate in the presence of pyridine at a temperature of from about −35°C to about 25°C.
3. The process of claim 2 carried out by adding allyl chloroformate to a solution of 2,2-dinitropropanol in pyridine.
4. The process of claim 2 carried out in the presence of an inert liquid diluent.
5. The process of claim 4 wherein said inert liquid diluent is a halogenated hydrocarbon of 1 to 6 carbon atoms.
6. The process of claim 5 wherein said halogenated hydrocarbon is a chlorohydrocarbon.
7. The process of claim 6 wherein said chlorohydrocarbon is 1,2-dichloroethane.
8. The process of claim 7 carried out at a temperature of about −20°C.

* * * * *